United States Patent [19]

Betz

[11] 3,956,187

[45] May 11, 1976

[54] CATALYST SUPPORT AND METHOD FOR PREPARING THE SAME

[76] Inventor: Erwin C. Betz, 524 Mill Valley Road, Palatine, Ill. 60067

[22] Filed: Jan. 21, 1974

[21] Appl. No.: 435,187

[52] U.S. Cl............................ 252/457; 252/458; 252/459; 252/455 R; 252/465; 252/467; 252/472; 252/477 R; 252/477 Q
[51] Int. Cl.² ............... B01J 29/00; B01J 29/10
[58] Field of Search ........... 252/458, 459, 455 R, 252/465, 467, 457, 477 R, 477 Q, 472

[56] References Cited
UNITED STATES PATENTS

| | | | |
|---|---|---|---|
| 1,935,178 | 11/1933 | Connolly | 252/477 R X |
| 2,364,015 | 11/1944 | Winding | 252/457 X |
| 2,485,260 | 10/1949 | Connolly | 252/457 X |
| 2,582,099 | 1/1952 | Braithwaite | 252/457 X |
| 3,044,954 | 7/1962 | Hirschler | 252/455 R X |
| 3,328,316 | 6/1967 | Mulaskey | 252/455 R |
| 3,417,031 | 12/1968 | Hinrichs et al. | 252/472 |
| 3,538,018 | 11/1970 | Pilch et al. | 252/455 R UX |
| 3,725,052 | 4/1973 | Masumoto et al. | 252/461 UX |
| 3,725,053 | 4/1973 | Masumoto et al. | 252/461 UX |
| R25,454 | 10/1963 | Novak | 252/477 R |

*Primary Examiner*—Paul F. Shaver
*Attorney, Agent, or Firm*—Hume, Clement, Brinks, Willian, Olds & Cook, Ltd.

[57] ABSTRACT

An improved metallic catalyst of high surface area is prepared from an alloy comprising a silicon and a second metal which is soluble in oxidizing acids. This alloy is contacted with an oxidizing acid for a time period and at a temperature and acid concentration sufficient to dissolve a portion of the second metal. The alloy is subsequently heated in an atmosphere of inert gas to which a small amount of oxygen is added to convert the silicon at the surface of the alloy to silicon dioxide.

33 Claims, No Drawings

CATALYST SUPPORT AND METHOD FOR PREPARING THE SAME

The present invention relates to a method for preparing improved metallic catalysts and catalyst supports having high surface area and to the catalysts and catalyst supports made thereby.

Generally, the catalysts of the present invention are prepared from an alloy which comprises silicon and a second metal, the second metal being soluble in oxidizing acids. In carrying out the method, the alloy is first contacted with an oxidizing acid for a time period and at a temperature and acid concentration sufficient to selectively dissolve a portion of the second metal. Subsequently, the alloy is oxidized under conditions sufficient to convert the silicon at the surface of the alloy to silicon dioxide.

It is well known in the art that the efficiency of a catalyst may be increased by increasing the surface area. In accordance with the present invention, a portion of the metal making up the alloy employed is dissolved in the oxidizing acid, while the silicon is not, thus creating tiny "valleys" where the dissolved metal is removed, while leaving "peaks" where the silicon remains. The presence of these peaks and valleys creates a high surface area.

It is important that the acid employed for the acid treatment step be an "oxidizing" acid. The reason for this requirement is that the oxidizing nature of the acid produces an oxide film on the surface of the silicon contained within the alloy. This oxide film has a very low solubility in the acid, and protects the silicon from attack. The second metal, which on the other hand is soluble in the oxidizing acid, is attacked and dissolved by the acid. While it is possible that oxidation as well as dissolution of this second metal occurs, the presence of the two phenomena makes no difference, and for purposes of the present invention, metals which are soluble in oxidizing acid includes metals that are oxidized by the oxidizing acid, and that have oxides that are soluble in oxidizing acids.

The preferred "oxidizing acid" for use in accordance with the present invention is nitric acid. However, other acids, such as phosphoric acid and aqua regia, can also be employed.

A wide variety of silicon-containing alloys may be employed with the present invention. As a general matter, such alloys should contain from about 2% to about 5% silicon by weight, and preferably such alloys comprise about 3.5 to 4.5% silicon because of the superior mechanical properties of alloys with lower silicon content. Above 5% silicon content, the alloys become extremely brittle.

The identity of the second, oxidizing acid-soluble metal depends upon a number of factors, the most important of which are the physical and mechanical properties desired in the alloy. The most preferred second metal is iron, which may be present in amounts from about 6% to about 98% by weight. However, alloys containing only iron and silicon have poor thermal stability, and it is therefore desirable to include an additional metal to improve these properties. Other second metals that may be alloyed with the silicon, and which are also soluble in the oxidizing acids, include nickel, magnesium, molybdenum, titanium, vanadium and tungsten. Combinations of these metals, with or without iron, can also be employed. Still other metals may also be used provided that a suitable alloy may be prepared with silicon, and also provided that these other metals are soluble in oxidizing acids. As with iron, the foregoing metals may be alloyed with the silicon in total amounts ranging from about 6 to 98% by weight.

Further metals may also be incorporated into the alloys in addition to those previously mentioned. Again, such further metals are often advantageously added to improve the mechanical properties or the heat resistance of the alloy. Suitable additional oxidizing acid-soluble metals are chromium, cobalt, and manganese. Of the latter metals, chromium is particularly suitable, and chromium-containing alloys have excellent characteristics in high-temperature applications. When chromium, cobalt, and manganese are employed, they may be incorporated into the alloy in amounts up to about 40% by weight. Above about 40%, the alloy suffers a loss in mechanical strength. While there is no required minimum, generally little effect on the alloy is seen when the chromium, cobalt, and/or manganese is below about 3% by weight.

When the alloy in accordance with the present invention contains more than two metals, there will be varying degrees of dissolution by the oxidizing acid, thus creating a very high surface area, having peaks and valleys of varying height and depth. A particularly suitable alloy for use in accordance with the present invention is one containing about 2 to 5% by weight silicon, about 20 to 40% by weight chromium, and the remainder iron. An especially preferred alloy contains about 4.5% silicon, about 35% chromium, and the remainder iron. Some of this iron may be replaced by additional metals and the non-metals in minor proportions, such as cobalt and manganese.

When magnesium is present in the metal, the silicon-magnesium ratio should be about 1.7:1 by weight. This ratio permits the formation of meerschaum,

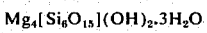

when the alloy is oxidized and then treated with caustic, followed by sintering of the surface, as hereinafter described.

The particular form of the metal is unimportant, except that it should be easy to handle. Generally, metal ribbon or thin metal sheets are preferred, although the method of the present invention may be employed to prepare catalysts in the form of screens, granules, or any other desired form.

As previously mentioned, the preparation of catalysts in accordance with the method of the present invention is commenced by contacting an alloy as described above with an oxidizing acid for a time period and at a temperature and acid concentration sufficient to dissolve a portion of the oxidizing acid-soluble metal. The acid concentration may be varied over a wide range, generally anywhere from about 2.5% to 100% by weight. Fuming acids may also be employed. It is preferable, however, to maintain the acid concentration in the range of about 8% to about 25% by weight, as better control of the metal dissolution can be exerted.

The temperature at which the acid is contacted with the metal may also vary over a wide range, and is not critical. Of course, with less concentrated acids, high temperatures are often required in order to obtain acceptable dissolutions speeds. As a general matter, the temperature of the acid may vary anywhere from a point just above the freezing point of the acid to very high temperatures, up to the decomposition temperature of the acid, provided that pressure is employed to prevent the acid from boiling away. As a practical matter, however, the treatment temperature should be at least about 20° C., preferably in the range of about 20° to 100° C., and more preferably in the range of about 20° to 75° C.

As mentioned above, the time of treatment will also vary over a wide range, and will be dependent upon both the temperature and the acid concentration. The time, temperature, and concentration factors should always be regulated so that only a portion of the oxidizing acidsoluble metal is dissolved. That is, if the treatment is too severe, the alloy can be greatly weakened mechanically, or even caused to disintegrate. On the other hand, if the conditions are insufficiently severe, the surface area may not be increased as much as desired. Regarding time of treatment, as a practical matter, treatment times in the range of about 1 minute to 90 minutes may be employed, with times in the range of about 5 to 30 minutes being preferred. Of course, in addition to the reaction conditions and acid concentration, the composition of the alloy itself, including the proportion of silicon and the identity of acid-soluble metals, must be taken into consideration. That is, the lower the percentage of acid-soluble metals, and the less the acid-solubility, the more severe are the conditions that must be employed.

Subsequent to the acid treatment, the alloy is preferably rinsed, and is then ready for the conversion of the silicon to silicon dioxide. As previously mentioned, the silicon at this point, at least at the surface, will be slightly oxidized as a result of the action of the oxidizing acid. In order to further increase the surface area of the catalyst, this silicon oxide is further oxidized to silicon dioxide, which has a high surface area.

The conversion of silicon to silicon dioxide may be accomplished by any suitable method, as is known to those skilled in the art. The preferred method is to heat the metal in the presence of an inert gas such as nitrogen, helium, and the like, to which about 5–10% oxygen by volume has been added. The purpose of using small quantities of oxygen is to prevent significant oxidation of the other metals in the alloy, which oxidize at a much slower rate than silicon. It is therefore seen that the aforementioned 5–10% range is not critical, and that the actual amount of oxygen employed will depend on the ease with which the other metals in the alloy can be oxidized.

The temperatures employed in the oxidation step will also depend on achieving a balance which maximizes oxidation of silicon, while minimizing the oxidation of other metals in the alloy. Generally, the alloy should be heated to a temperature just below red heat, which will ordinarily be in the range of about 380°–420° C. The oxidation time is relatively short, generally in the range of about 5 to 10 minutes. Again, these ranges are exemplary, and not critical, and should be selected with a view of achieving maximum silicon oxidation, while minimizing the oxidation of other metals in the alloy.

Another method of oxidizing the silicon, which has the advantage than it does not oxidize any of the other metals in the alloy is to treat the alloy with an alkali metal hydroxide (e.g. NaOH), which converts the silicon to an alkali metal silicate (e.g. $Na_2O.SiO_2$). This treatment may be accomplished by immersing the alloy in molten alkali metal hydroxide for a few minutes, or preferably by immersing the alloy in a concentrated (e.g., 50–87% by weight) solution of alkali metal hydroxide which has been heated to boiling. The treatment time with alkali metal hydroxide is not critical, but should be sufficient to convert the exposed silicon to the silicate. As a practical matter, the treatment time should be maintained in the range of about 2 to 90 minutes, and preferably about 20 to 40 minutes. The resulting silicate is then leached with boiling water to dissolve the $Na_2O$, leaving $SiO_2$ behind. The metal is then dried, with or without heating, although mild heating, say to a temperature of 50° C., speeds the drying process.

As previously mentioned, in one embodiment of the invention, an alloy containing both silicon and magnesium is employed to prepare a catalyst having a double silicate of very high surface area, similar to meerschaum. Meerschaum has the formula $Mg_4[Si_6O_{15}](OH)_2.3H_2O$, sometimes written $2MgO.3SiO_2.2H_2O$. In order to produce this compound, the silicon and magnesium should be present in the alloy in the atomic ratio of 3:2, or in the Si:Mg weight ratio of about 1.7:1.

To prepare a catalyst support having a meerschaum surface, the alloy is first oxidized as previously described. The alloy is then treated with an alkali metal hydroxide as previously described, and is leached in boiling water for about 5 minutes to 1 hour to remove $Na_2O$. The surface of the alloy is then sintered by placing it in an oven and heating it gradually from a minimum temperature below about 150° C. up to a temperature of about 320°–350° C. over a time period of about 8–12 hours. The alloy is then heated in an oven at about 700°–750° C. for about 10–15 minutes.

Virtually any catalytic metal may be applied to the high-surface area catalyst support of the present invention. Included among such catalytic metals are the metals of Group VIII of the Periodic Table, the rare earths, and other metals including silver, titanium, manganese, copper, chromium, cadmium, molybdenum, vanadium, tungsten, rhenium, thorium, and actinium. Various combinations of these catalysts are also advantageously employed in a wide variety of catalyst applications. A particularly important application of catalysts of the present invention is in air pollution control applications, wherein it is desired to oxidize or reduce gases in order to destroy pollutants. An oxidizing catalyst having a preference for certain hydrocarbons may be prepared, for example, by depositing manganese and cobalt on the surface. A cracking catalyst may be prepared by depositing, for example, a combination of manganese, cobalt, and copper. A catalyst having characteristics lying between those of a cracking catalyst and of an oxidation catalyst may be prepared, for example, by depositing upon the surface a combination of molybdenum, titanium and chromium. An almost infinite variety of other catalysts may be prepared, as will be appreciated by those skilled in the art.

The deposition of catalytically active metals upon the catalysts of the present invention may be accomplished either by electroplating or by chemical deposition, i.e., by chemical reduction of salt solutions. Both of these methods are well known in the art.

When the catalytically active metal is deposited by electrodeposition, it will probably be deposited primarily in the crevices or "valleys," since the silica in the catalyst will have a relatively low conductivity. Thus, a catalyst which has exposed silica may be prepared. On the other hand, when the metal is deposited by the reduction of salt solution, it is deposited evenly over the entire surface area. Depending upon the amount deposited, the silica may or may not be exposed.

It is also well known in the art that catalytic metals must generally be activated by conversion to the oxide form, and by contacting them with a stream of hydrocarbons subsequent to deposition. Such activation may also be performed with the catalysts of the present invention by procedures which are well known in the art.

The following examples are intended to illustrate the present invention, and should not be construed as limitative, the scope of the invention being determined by the appended claims.

EXAMPLE I

The alloy employed in this example is in the form of a ribbon, and contains 59.5% iron, 35% chromium, 4.5% silicon, and 0.1% carbon, all of the foregoing percentages being by weight. This ribbon is crimped, cut into pieces 5 centimeters in length, and placed between a 3-mesh and a 15-mesh stainless steel screen.

The catalyst mat thus prepared is immersed in nitric acid having a concentration of about 10% by weight. The temperature is maintained in the range of about 50° to 75° C. The acid is continuously agitated with a recycle pump, and is filtered as it is recycled. The alloy is maintained in contact with the acid for about 15 minutes by being continuously dipped into the acid, removed, and reimmersed, in order to allow the dissolved metal, primarily iron, to run off. Fresh acid is introduced into the recycle stream in order to maintain the acid concentration in the range of 8 to 15% by weight. Spent acid is withdrawn to maintain a constant volume in the system.

Subsequent to the acid treatment, the alloy is rinsed, and is then placed in an oven, and a mixture of 8% oxygen and 92% nitrogen is delivered through the oven. The temperature of the oven is 400° C. The 400° C. temperature is maintained for 10 minutes, in order to completely oxidize the silicon to silicon dioxide. After cooling, the catalyst support is ready for the application of a catalyst.

EXAMPLE II

A platinum catalyst is deposited upon the catalyst support prepared in accordance with Example I according to the following procedure. First, 18.75 grams of chloroplatinic acid ($H_2PtCl_6$) are dissolved in 300 grams of water and neutralized with sodium carbonate. This solution is then diluted to allow the application of 0.5 to 1.0 grams of $PtCl_4$ equivalent to every square centimeter of surface area of the support. A second solution is prepared by dissolving 15 grams of sodium carbonate and 10 grams of sodium formate in 300 ml. of water, and by diluting this solution to 2700 ml.

The chloroplatinic acid and sodium formate solutions are combined, and the catalyst prepared in accordance with Example I is inserted into the solution. The catalyst is allowed to remain immersed in the solution for 20 minutes, with agitation. The deposition of platinum occurs in accordance with the following reaction:

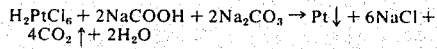

$H_2PtCl_6 + 2NaCOOH + 2Na_2CO_3 \rightarrow Pt\downarrow + 6NaCl + 4CO_2\uparrow + 2H_2O$ The catalyst is removed from the solution and heated in air at 90° C. for 30 minutes, and then washed in cold water to remove residual sodium chloride. The catalyst is then heated in air at 350° C., the temperature being gradually increased to 500° C. over a time period of about 30 minutes. To activate the catalyst, about 12–15 grams of toluol per cubic meter of air are periodically added to the air stream. This procedure activates the catalyst by changing its crystalline structure, as is well known in the art.

EXAMPLE III

The alloy employed in this example is in the form of a ribbon containing 58.5% iron, 35% chromium, 4% silicon, 2.4% magnesium, and 0.1% carbon, all of these percentages being by weight. The ribbon is crimped, and a catalyst mat is prepared as in Example I. The catalyst mat is then treated with nitric acid, also as in Example I.

After rinsing, the mat is immersed in a solution of sodium hydroxide having a concentration of 75% by weight for 30 minutes at a temperature of about 50° C. After this treatment, the alloy is rinsed by dipping into warm water, and is then immersed in boiling water for 15 minutes to leach out $Na_2O$. The alloy is then placed in an oven at 120° C. The temperature is gradually increased to 340° C. over a time period of 10 hours. The alloy is then removed from the oven and is placed in a second oven at 720° C. for 10 minutes to complete the sintering of the surface and to form a meerschamlike substance. The support may be coated with a catalytically active metal by chemical reduction of a salt solution or by plating, as previously described.

Obviously, many modifications and variations of the invention as hereinbefore set forth will occur to those skilled in the art, and it is intended to cover in the appended claims all such modifications and variations as fall within the true spirit and scope of the invention.

I claim:

1. A method for preparing a metallic catalyst support having a high surface area from an alloy comprising up to about 5% silicon and a second metal, said second metal being selected from the group consisting of iron, nickel, molybdeum, titanium, vanadium, tungsten, and mixtures thereof, said method comprising: contacting said alloy with an oxidizing acid selected from the group consisting of nitric acid, phosphoric acid, and aqua regia for a time period and at a temperature and acid concentration sufficient to dissolve a portion of said second metal; and subsequently oxidizing said alloy under conditions sufficient to convert silicon at the surface of said alloy to silicon dioxide.

2. The method as defined in claim 1 wherein said oxidizing acid is nitric acid.

3. The method as defined in claim 1 wherein said second metal comprises iron.

4. The method as defined in claim 3 wherein said alloy further comprises about 20–40% chromium by weight.

5. The method as defined in claim 3 further including the step of applying a catalytically active metal to said catalyst support.

6. The method as defined in claim 5 wherein said catalytically active metal is a noble metal from Group VIII of the Periodic Table.

7. The method as defined in claim 6 wherein said noble metal is electroplated onto said catalyst support.

8. The method as defined in claim 6 wherein said noble metal is deposited onto said support by the chemical reduction of a salt solution.

9. The method as defined in claim 1 further comprising the step of applying a catalytically active metal to said catalyst support.

10. The method as defined in claim 1 wherein said alloy is oxidized by heating in the presence of an oxygen-containing atmosphere.

11. The method as defined in claim 1 wherein said alloy is oxidized by treatment with an alkali metal hydroxide followed by leaching with boiling water.

12. A method for preparing a metallic catalyst support having a high surface area from an alloy comprising about 2% to about 5% silicon, by weight, and a second metal selected from the group consisting of iron, nickel, molybdenum, titanium, vanadium, tungsten, and mixtures thereof, said method comprising: contacting said alloy with an oxidizing acid selected from the group consisting of nitric acid, phosphoric acid, and aqua regia, said acid having a concentration of at least about 2.5% by weight for a time period of about 1 to 90 minutes, whereby to dissolve a portion of said second metal; subsequently heating said alloy to a temperature of about 380°–420°C. for about 5–10 minutes in the presence of an atmosphere containing about 5–10% oxygen by volume.

13. The method as defined in claim 12 wherein said oxidizing acid is nitric acid.

14. The method as defined in claim 13 wherein said second metal comprises iron.

15. The method as defined in claim 14 wherein said alloy further comprises about 20–40% chromium by weight.

16. The method as defined in claim 15 further comprising the step of applying a catalytically active metal to said catalyst support.

17. The method as defined in claim 16 wherein said catalytically active metal is a noble metal from Group VIII of the Periodic Table.

18. The method as defined in claim 12 further comprising the step of applying a catalytically active metal to said catalyst support.

19. A method for preparing a catalyst support from an alloy comprising about 2–5% silicon, by weight and a second metal, said second metal being selected from the group consisting of iron, nickel, molybdenum, titanium, vanadium, tungsten, and mixtures thereof, and said alloy further comprising about 1.2–3.4% magnesium, the weight ratio of said silicon to said magnesium bring about 1.7 to 1, said method comprising: contacting said alloy with an oxidizing acid selected from the group consisting of nitric acid, phosphoric acid, and aqua regia, said acid having a concentration of at least about 2.5% by weight for a time period of about 1–90 minutes, whereby to dissolve a portion of said second metal; contacting said alloy with a solution of alkali metal hydroxide for about 2–90 minutes; immersing said alloy in boiling water for about 5 minutes to 1 hour; heating said alloy from a temperature below about 150°C. to a maximum temperature of about 320°–350°C. over a period of about 8–12 hours; and then heating said alloy to about 700°–750°C. for about 10–15 minutes.

20. The method as defined in claims 19 wherein said second metal comprises iron.

21. The method as defined in claim 20 wherein said alloy further comprises about 20–40% chromium by weight.

22. The method as defined in claim 21 further comprising the step of applying a catalytically active metal to said catalyst support.

23. The method as defined in claim 22 wherein said catalytically active metal is a noble metal from Group VIII of the Periodic Table.

24. A method for preparing a catalyst support from an alloy comprising about 2–5% silicon by weight, about 20–40% chromium by weight, and about 6–76% iron by weight, said method comprising: contacting said alloy with nitric acid having a concentration of at least about 2.5% by weight for a time period of about 1–90 minutes at a temperature of about 20° to 100° C.; and oxidizing said silicon by heating said alloy to a temperature of about 380°–420° C. for about 5–10 minutes in an atmosphere of inert gas to which about 5–10% oxygen by volume has been added.

25. The method as defined in claim 24 further comprising the step of applying a catalytically active metal to said catalyst support.

26. The method as defined in claim 25 wherein said catalytically active metal is a noble metal from Group VIII of the Periodic Table.

27. A catalyst support prepared in accordance with the method of claim 12.

28. A catalyst support prepared in accordance with the method of claim 15.

29. A catalyst support prepared in accordance with the method of claim 16.

30. A catalyst support prepared in accordance with the method of claim 17.

31. A catalyst support prepared in accordance with the method of claim 19.

32. A catalyst support prepared in accordance with the method of claim 22.

33. A catalyst support prepared in accordance with the method of claim 24.

* * * * *